US011171974B2

(12) United States Patent
Gertner et al.

(10) Patent No.: US 11,171,974 B2
(45) Date of Patent: *Nov. 9, 2021

(54) DISTRIBUTED AGENT BASED MODEL FOR SECURITY MONITORING AND RESPONSE

(71) Applicant: Fred Herz Patents, LLC, Milton, WV (US)

(72) Inventors: Yael Gertner, Champaign, IL (US); Frederick S. M. Herz, Milton, WV (US); Walter Paul Labys, Fairfax, VA (US)

(73) Assignee: Inventship LLC, Warrington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,399

(22) Filed: Nov. 21, 2016

(65) Prior Publication Data

US 2017/0078317 A1    Mar. 16, 2017

Related U.S. Application Data

(63) Continuation of application No. 14/043,567, filed on Oct. 1, 2013, now Pat. No. 9,503,470, which is a (Continued)

(51) Int. Cl.
 *H04L 29/06* (2006.01)
(52) U.S. Cl.
 CPC ........ *H04L 63/1425* (2013.01); *H04L 63/145* (2013.01); *H04L 63/1416* (2013.01); *H04L 63/1441* (2013.01)
(58) Field of Classification Search
 CPC .......................... H04L 63/145; H04L 63/1425
 See application file for complete search history.

(56) References Cited

U.S. PATENT DOCUMENTS

| 5,754,938 A | 5/1998 | Herz et al. |
| 5,754,939 A | 5/1998 | Herz et al. |

(Continued)

OTHER PUBLICATIONS

U.S. Appl. No. 61/702,453, filed Sep. 12, Akshay Vashist.*

(Continued)

*Primary Examiner* — Jeffrey C Pwu
*Assistant Examiner* — Thong P Truong
(74) *Attorney, Agent, or Firm* — Culhane Meadows, PLLC (57) ABSTRACT

An architecture is provided for a widely distributed security system (SDI-SCAM) that protects computers at individual client locations, but which constantly pools and analyzes information gathered from machines across a network in order to quickly detect patterns consistent with intrusion or attack, singular or coordinated. When a novel method of attack has been detected, the system distributes warnings and potential countermeasures to each individual machine on the network. Such a warning may potentially include a probability distribution of the likelihood of an intrusion or attack as well as the relative probabilistic likelihood that such potential intrusion possesses certain characteristics or typologies or even strategic objectives in order to best recommend and/or distribute to each machine the most befitting countermeasure(s) given all presently known particular data and associated predicted probabilistic information regarding the prospective intrusion or attack. If any systems are adversely affected, methods for repairing the damage are shared and redistributed throughout the network.

16 Claims, 1 Drawing Sheet

Related U.S. Application Data continuation-in-part of application No. 10/746,825, filed on Dec. 24, 2003, now Pat. No. 8,327,442, which is a continuation-in-part of application No. 10/693,149, filed on Oct. 23, 2003, now Pat. No. 8,046,835.

(60) Provisional application No. 61/708,304, filed on Oct. 1, 2012, provisional application No. 60/436,363, filed on Dec. 24, 2002.

(56) References Cited

U.S. PATENT DOCUMENTS

| | | | |
|---|---|---|---|
| 6,088,804 | A | 7/2000 | Hill et al. |
| 6,122,743 | A | 9/2000 | Shaffer et al. |
| 6,158,010 | A | 12/2000 | Moriconi et al. |
| 6,301,668 | B1 | 10/2001 | Gleichauf et al. |
| 6,345,299 | B2 | 2/2002 | Segal |
| 6,347,338 | B1 | 2/2002 | Segal |
| 6,353,385 | B1 | 3/2002 | Molini |
| 6,405,318 | B1 | 6/2002 | Rowland |
| 6,530,024 | B1 | 3/2003 | Proctor |
| 6,597,777 | B1 | 7/2003 | Ho |
| 6,663,000 | B1 | 12/2003 | Muttik et al. |
| 6,711,615 | B2 | 3/2004 | Porras et al. |
| 6,725,377 | B1 | 4/2004 | Kouznetsov |
| 6,742,128 | B1 * | 5/2004 | Joiner ............... H04L 63/1408 726/25 |
| 6,769,066 | B1 | 7/2004 | Botros et al. |
| 6,772,349 | B1 | 8/2004 | Martin |
| 6,952,779 | B1 | 10/2005 | Cohen et al. |
| 6,996,843 | B1 | 2/2006 | Moran |
| 7,013,330 | B1 | 3/2006 | Tarbotton et al. |
| 7,058,968 | B2 | 6/2006 | Rowland et al. |
| 7,181,769 | B1 | 2/2007 | Kianini et al. |
| 7,185,368 | B2 | 2/2007 | Copeland, III |
| 7,222,366 | B2 | 5/2007 | Bruton, III |
| 7,228,564 | B2 | 6/2007 | Raikar et al. |
| 7,350,069 | B2 | 3/2008 | Herz et al. |
| 7,594,260 | B2 | 9/2009 | Porras et al. |
| 7,630,986 | B1 | 12/2009 | Herz et al. |
| 8,046,835 | B2 | 10/2011 | Herz |
| 8,327,442 | B2 | 12/2012 | Herz et al. |
| 8,490,197 | B2 | 7/2013 | Herz |
| 8,490,497 | B2 | 7/2013 | Herz |
| 8,925,095 | B2 | 12/2014 | Herz et al. |
| 9,438,614 | B2 | 9/2016 | Herz |
| 9,503,470 | B2 | 11/2016 | Gertner et al. |
| 2002/0059078 | A1 | 5/2002 | Valdes et al. |
| 2002/0066034 | A1 | 5/2002 | Schlossberg et al. |
| 2002/0067832 | A1 * | 6/2002 | Jablon ............... H04L 9/0844 380/277 |
| 2003/0004688 | A1 * | 1/2003 | Gupta ............... G06F 21/55 702/188 |
| 2003/0051163 | A1 | 3/2003 | Bidaud |
| 2003/0101260 | A1 | 5/2003 | Dacier et al. |
| 2003/0115322 | A1 | 6/2003 | Moriconi et al. |
| 2003/0145225 | A1 | 7/2003 | Bruton, III et al. |
| 2004/0123142 | A1 | 6/2004 | Dubal et al. |
| 2004/0153666 | A1 | 8/2004 | Sobel et al. |
| 2004/0165588 | A1 | 8/2004 | Pandya |
| 2004/0215972 | A1 | 10/2004 | Sung et al. |
| 2004/0250060 | A1 | 12/2004 | Diep |
| 2005/0257247 | A1 | 11/2005 | Moriconi et al. |
| 2006/0069749 | A1 | 3/2006 | Herz et al. |
| 2006/0259970 | A1 * | 11/2006 | Sheymov ............... G06F 21/55 726/23 |
| 2008/0071578 | A1 | 3/2008 | Herz et al. |
| 2011/0078797 | A1 * | 3/2011 | Beachem ............... G06F 21/53 726/25 |
| 2012/0131674 | A1 | 5/2012 | Wittenschlaeger |
| 2014/0082730 | A1 * | 3/2014 | Vashist ............... H04L 63/1416 726/23 |

OTHER PUBLICATIONS

"U.S. Appl. No. 10/746,825, Advisory Action dated Mar. 11, 2008", 3 pgs.
"U.S. Appl. No. 10/746,825, Final Office Action dated Mar. 1, 2010", 26 pgs.
"U.S. Appl. No. 10/746,825, Final Office Action dated Apr. 24, 2009", 20 pgs.
"U.S. Appl. No. 10/746,825, Final Office Action dated Oct. 10, 2007", 21 pgs.
"U.S. Appl. No. 10/746,825, Non Final Office Action dated Jan. 24, 2011", 29 pgs.
"U.S. Appl. No. 10/746,825, Non Final Office Action dated Jul. 16, 2008", 20 pgs.
"U.S. Appl. No. 10/746,825, Non Final Office Action dated Aug. 28, 2009", 24 pgs.
"U.S. Appl. No. 10/746,825, Non Final Office Action dated Sep. 15, 2011", 31 pgs.
"U.S. Appl. No. 10/746,825, Non Final Office Action dated Dec. 7, 2006", 11 pgs.
"U.S. Appl. No. 10/746,825, Notice of Allowance dated Aug. 1, 2012", 30 pgs.
"U.S. Appl. No. 10/746,825, Response filed Jan. 16, 2009 to Non Final Office Action dated Jul. 16, 2008", 13 pgs.
"U.S. Appl. No. 10/746,825, Response filed Feb. 11, 2008 to Final Office Action dated Oct. 10, 2007", 43 pgs.
"U.S. Appl. No. 10/746,825, Response filed Mar. 15, 2012 to Non Final Office Action dated Sep. 15, 2011", 18 pgs.
"U.S. Appl. No. 10/746,825, Response filed Arp. 10, 2008 to Advisory Action dated Mar. 11, 2008", 15 pgs.
"U.S. Appl. No. 10/746,825, Response filed Jun. 7, 2007 to Non Final Office Action dated Dec. 7, 2006", 32 pgs.
"U.S. Appl. No. 10/746,825, Response filed Jun. 24, 2011 to Non Final Office Action dated Jan. 24, 2011", 19 pgs.
"U.S. Appl. No. 10/746,825, Response filed Jul. 24, 2009 to Final Office Action dated Apr. 24, 2009", 13 pgs.
"U.S. Appl. No. 10/746,825, Response filed Aug. 2, 2010 to Final Office Action dated Mar. 1, 2010", 15 pgs.
"U.S. Appl. No. 10/746,825, Response filed Nov. 30, 2009 to Non Final Office Action dated Aug. 28, 2009", 15 pgs.
"U.S. Appl. No. 14/043,567, Non Final Office Action dated Oct. 30, 2015", 16 pgs.
"U.S. Appl. No. 14/043,567, Notice of Allowance dated Jul. 18, 2016", 18 pgs.
"U.S. Appl. No. 14/043,567, Preliminary Amendment filed Sep. 1, 2015", 8 pgs.
"U.S. Appl. No. 14/043,567, Response filed Mar. 30, 2016 to Non Final Office Action dated Oct. 30, 2015", 11 pgs.
Anderson, et al., "Next Generation Intrusion Detection Expert System (NIDES) A Summary", SRI-CSL-97-07, (May 1995), 47 pgs.
Denning, D E, "An Intrusion-Detection Model", IEEE Transactions on Software Engineering, vol. SE-13, No. 2, (Feb. 1987), 222-232.

* cited by examiner

DISTRIBUTED AGENT BASED MODEL FOR SECURITY MONITORING AND RESPONSE

CROSS-REFERENCE TO RELATED APPLICATIONS

The present application is a continuation of U.S. patent application Ser. No. 14/043,567 filed Oct. 1, 2013, which claims benefit to U.S. Provisional Application No. 61/708,304 filed Oct. 1, 2012, and which is a Continuation-in-Part of application Ser. No. 10/746,825, filed Dec. 24, 2003, now U.S. Pat. No. 8,327,442, which is, in turn, a Continuation-in-Part of application Ser. No. 10/693,149, filed Oct. 23, 2003, now U.S. Pat. No. 8,046,835, that further claims benefit of Provisional Patent Application 60/436,363, filed Dec. 24, 2002. These patent applications are incorporated herein by reference in their entireties.

BACKGROUND OF THE INVENTION (1) Field of the Invention

The invention related to the field of security systems for computer networks.

(2) Description of Related Art

The United States and the rest of the world present a target rich environment for a variety of cyber threats. Rogue hackers (e.g. Anonymous) have created significant disruptions. Criminal organizations have employed botnets and other strategies to engage in massive wealth transfers. And state-affiliated actors have penetrated a number of US entities, including the US Chamber of Commerce, Nortel, and others.

Particularly troubling is the fact that many of the activities have gone undetected for significant periods of time, suggesting that what we have seen is only the tip of the iceberg. Further, while much of this activity has been aimed at achieving political, financial, or diplomatic advantage, there is the troubling possibility of a coordinated attack taking out critical infrastructure in military, industrial, power generation, financial and other critical centers. If a previously prepared attack were coordinated with a significant conventional threat there could be global ramifications.

Per NSA Director Keith Alexander, perhaps a trillion dollars a year is being spent on cyber defense. This has not, however, bought a trillion dollars' worth of confidence in our cyber defenses.

It has proved difficult to bring threatened institutions up to currently recognized levels of best practice, i.e. use of secure passwords, single sign-on, least privilege, multiple firewalls, and so on. And it is far from clear that even current best practice is "best" enough.

Further, the large expenditures themselves represent a kind of failure. The current cyber-attacks represent a strongly asymmetric form of warfare. Individuals and small groups can create extraordinary DDOS attacks with only limited resources. The increasing complexity of software creates an exponential increase in potential points of attack. Increasing sophistication in hacks, e.g. self-assembling viruses, is providing new ways to exploit weakness. And the general sloppiness of the web—together with its use for more and more critical infrastructure—generates what one might euphemistically refer to as a "negative progress situation".

If attackers can spend small quantities of resource while generating large, expensive, slow, and relatively ineffectual responses, then even a successful response, if expensive enough, may mean a net strategic fail.

If we are to reverse this trend we will need approaches which are:
1. Adaptive
2. Autonomous
3. Automatic They must be adaptive because the threats are, autonomous because the threats are high frequency and unceasing, and automatic because human response times are too great.

What is desired is something like an immune system for software, where even novel threats are recognized quickly and kick off a well-defined cascade of defensive and prophylactic measures, without conscious attention. Ideally the hyper-caffeinated hackers might spend weeks devising a new line of attack, only to see it flagged as abnormal and countered in milliseconds. The inventors have, ultimately, no objection to asymmetry, and would just like to see the sharp end of the asymmetry pointing in the other direction.

This is a non-trivial problem. Given the significance and difficulty of the problem, sound principles of portfolio management require exploration of a wide variety of approaches.

One approach to this problem is a distributed agent-based model for network security described in U.S. Pat. No. 8,046,835, and incorporated above by reference. As explained further below, this patent describes a distributed multi-agent system for real-time collection, monitoring, aggregation, and modeling of system and network operations, communications, internal and external access, coded execution functions, network and network resource conditions, as well as other assessable criteria. A Bayesian model is used to estimate likelihoods of various threat vectors. The model provides access to the reasoning behind its inferences. It may recommend or in some cases even implement responses to detected threats.

Since the time that the subject matter described in U.S. Pat. No. 8,046,835 was developed, cloud and other technologies have made tests of it significantly more feasible in the last few years. The basic idea is a large number of sensors, aggregators, and other agents monitor an at-risk system looking for anomalies. Bayesian analysis is used to estimate the probabilities that a particular pattern of activity is hostile. In the most sensitive cases, any variation from established baselines might be considered potentially hostile. Many of the agents could live in the secure cloud, keeping them from putting too much of a load on the defended system, letting their activity ramp up quickly when threat levels are higher, and keeping them themselves from being a target.

Since the individual agents are simple, once the overall architecture has been validated, tuning the system to respond to new threats and opportunities should be rapid, being often merely a matter of writing a small agent & telling the system to listen to it. This is analogous to the way "plug-in" modules are currently used to quickly augment the capabilities of browsers, word processors and the like. For example, if software certification authorities become generally available, certification agents could verify firmware and executables against published checksums, at random intervals or when an attack is suspected.

Calibration of the Bayesian model is of course key. Banks of reference systems (i.e. "honey pots")—some prepared clean, others prepared with known threats present—could be used to tune & validate the model. Use of cloud computing makes it economical to run thousands of tests simultaneously, ideally giving a relatively accurate way to judge under what conditions the model can be allowed to trigger an automated response and when verification by a human operator would be first required.

While the inventors are now focused on the cyber security problem, the original system was meant to be more general in application, with network security, financial, medical, and other applications. The agents can be used to:
1. Establish baselines
2. Identify variations
3. Generate smaller groups of agents to target specific threats (vaccines)
4. Initiate automated responses, as raising firewalls, switching to a spare machine not under attack, and so on
5. Serve as laboratories for developing counter-agents, verifying pre-deployment they will be effective against their intended target with a minimum of collateral damage.

Given that the development of such distributed agent-based models for security modeling and response is now feasible, the next step is develop some reference implementations, to test the ideas in practice. One approach is to work with existing vendors, i.e. Cogility or Blue Canopy, to see how this agent-based system can help automate their existing threat detection approaches. Another is to work with vanilla Linux systems, again with the goal of automating the synthesis of existing monitoring tools into an adaptive, autonomous, and automatic security monitoring and response system. The present invention addresses these needs in the art.

BRIEF SUMMARY OF THE INVENTION

An architecture is provided for a widely distributed security system (SDI-SCAM) that protects computers at individual client locations, but which constantly pools and analyzes information gathered from machines across a network in order to quickly detect patterns consistent with intrusion or attack, singular or coordinated. When a novel method of attack has been detected, the system distributes warnings and potential countermeasures to each individual machine on the network. In a preferred implementation, such a warning may potentially consist of a probability distribution of the likelihood of an intrusion or attack as well as the relative probabilistic likelihood that such potential intrusion possesses certain characteristics or typologies or even strategic objectives in order to best recommend and/or distribute to each machine the most befitting countermeasure(s) given all presently known particular data and associated predicted probabilistic information regarding the prospective intrusion or attack. If any systems are adversely affected, methods for repairing the damage are shared and redistributed throughout the network. The net impact of SDI-SCAM is that every machine on a network can benefit from security experience gained at any other point on the network. A high and uniform level of security is therefore assured to all systems attached to the network, and this security is updated in real-time.

In exemplary embodiments, systems and methods are provided for detecting the state of a computer network by providing a plurality of distributed agents disposed in the computer network to passively collect, monitor, and aggregate data representative of activities of respective nodes within said computer network. The aggregated data is analyzed to develop activity models based on collected data and representative of activities of the network in a normal state and activities of the computer network in an abnormal state as a result of intrusions, infections, scams and/or other suspicious activities in the computer network. The data analysis includes performing a pattern analysis on the collected data to identify patterns in the collected data representative of suspicious activities. Counter-offensive measures are generated where unauthorized access to a program or file containing executable code results in the program or file disabling an operating system with all associated applications of a computer in the computer network until/unless the presumed attacker is able to prove to the machine owner/victim that the presumed attacker had been authorized to access the target data or machine provoking the said counter offensive measure.

The systems and methods of the exemplary embodiments also may aggregate and analyze data to develop a probabilistic likelihood of a threat to safe code, machines, servers, or individuals, and generate counter-offensive measures that are targeted to a given threat or attack based upon historical feedback from successes and failures of previous counter measures used in response to similar attacks and threats. An adaptive learning or adaptive rule base may be updated with the historical feedback. The systems and methods also may aggregate and analyze data pertaining to software within the network in order to enable detection and characterization of vulnerabilities and/or provide recommendations for remedial repair or revision. In addition, the systems and methods may generate a bogus target for invoking attack on the bogus target for purposes of achieving early detection of a system infection.

These and other characteristic features of the invention will become apparent to those skilled in the art from the following description.

BRIEF DESCRIPTION OF THE DRAWINGS

The FIGURE demonstrates some of the architectural features discussed, including (a) redundant memory within a given machine, (b) redundant connections between clients and servers, (c) SDI-SCAM installed as a primary security system, (d) SDI-SCAM piggybacking on an existing security system, (e) direct client-to-client agent communications, (f) on a router.

DETAILED DESCRIPTION OF THE INVENTION

The basic architectural approach for SDI-SCAM as described in U.S. Pat. No. 8,046,835 is that each node of a computer network is loaded with an agent capable both of ensuring security at the locality of the machine on which it is installed, and of communicating with other SDI-SCAM agents across the network. Because agent configurations are highly flexible, SDI-SCAM implementations can vary widely, running the spectrum from fully centralized (in which SDI-SCAM agents on client machines communicate uniquely with a centralized server dedicated to processing security-related information) to fully distributed (in which each client agent is given the ability to process security information locally, and information is shared on a peer-to-peer basis).

Basic Network Elements of SDI-SCAM

The preexisting elements of this network security system are the machines themselves. It is assumed that these systems, which act as the nodes of a network, consist of heterogeneous pieces of hardware running different sorts of operating systems. It may well be the case that various security layers will already be in place.

Additional Hardware

In preparation for the installation of SDI-SCAM across a network, it will often be desirable to upgrade existing machines with redundant hardware.

In a preferred embodiment, preexisting systems will be supplemented with redundant memory systems that persistently mirror the contents of the primary memory banks. When a computer's primary memory is corrupted (as can happen during a viral attack), it can be completed, cleared and reset with a pre-corruption image from the backup.

A further redundancy can be built into the network connections that link the local nodes to SDI-SCAM servers. For example, a computer that normally operates through land-based optic lines may be given an additional wireless connection through a satellite system.

An expensive, but preferred, architecture is to connect each SDI-SCAM agent through a fully isolated network that operates independently from the network on which the protected system resides. Thus, the SDI-SCAM agent will remain in contact with the security network even when the system it is supporting is under a sustained or unusually intense attack.

SDI-SCAM Agents

An agent is an entity that can be loaded onto any node(s) of a network, and which in this case is assigned responsibilities related to system security. Note that the construction of a given agent can vary widely, as it can be implemented through software, through hardware, through human interaction, or some combination thereof. In a preferred embodiment of SDI-SCAM, every machine linked into the system is loaded with an SDI-SCAM agent. Agent responsibilities include the following:

1) The collection of traffic data—among other things, each agent observes the packets being routed through its local system, observes every file transmission, monitors every user action, and logs every request for access.

2) The ability to communicate with other SDI-SCAM agents—each agent has the ability to communicate and exchange information with other agents (although the content of this information and the agents with which it is shared may be controlled, as will be discussed later). In normal use, a remote agent will send filtered traffic information downstream. When other agents detect potential security threats, warnings will pass upstream back to the remote agent.

3) The maintenance of various protections—On a continual basis, SDI-SCAM agents send and receive warnings and potential countermeasures relevant to whatever network risks are the most likely at a given time. For example, if a computer virus is detected at one node on the network, the local agent will immediately communicate a warning to all other agents in its contact neighborhood. If an attack is especially bad, the agent will have the ability to swap into the backup memory or contact other agents through alternative communications lines.

SDI-SCAM can operate either as a standalone security system, or as an additional layer that subsumes (and takes priority over, in cases of conflict) existing security protocols.

4) The ability to repair damage—Even after a node is known to have been attacked, the SDI-SCAM agent can be given access privileges such that it can aid the system administrator in controlling and repairing whatever damage has resulted.

5) The ability to scan collected data traffic for patterns consistent with threats—In many configurations, SDI-SCAM agents share their traffic information with a dedicated SDI-SCAM server capable of gathering and sifting through the entirety of the traffic data in order to detect patterns consistent with a network attack, be it related to a hacker or to a new virus. Certain traffic events, which individually may be mistaken as simple anomalies, may become more apparent when the totality of a network's (or multiple networks) traffic is considered on a macro scale.

6) Notifying system administrators in the event of certain probabilistic attributes exceeding certain levels—The system's implementation of a Belief network (as herein disclosed) may also be used to determine under what overall conditions of probabilistically determined and descriptive variables it is advantageous to notify the system administrator. These variables can be based upon the predicted likelihood for the system to solve the problem, prevent certain types of problems, undesirable events and/or quantified degrees thereof from occurring or manual/or manually adaptive rules may prescribe threshold settings for some or all of these key variables. Among other situations, the system administrator may be notified or alerted in cases in which patterns detected may be only slightly suspicious according to the standard screening methodology, however, are consistent with SDI-Scam's best estimated simulation model from its distributed agent sources of how a threat might emerge, e.g., by mutation and re-emergence, e.g., after initially being defeated by SDI-Scam.

Meta-data associated with the accessor like a watermark that can also be embedded in code that contains digital credentials of the user, however, incorporates the use of "potentially" rogue, irresponsible, or destructive individuals as per the types of associated predictive attributes from criteria as disclosed in a presently preferred embodiment. The code cannot be tampered with without interrupting the watermark. A more general term for this "invisible" code sequence, which appears random to a would-be interceptor, is "embedded code". Typically, the embedding is done in a much larger nonsense message to apparently random patterns (in as much as the application code would already be encrypted) and this nonsense message content may not be required. Also, it can be associated with functionally defined portions of the code, which pre-approve certain behaviors. The system could also be based upon willingness of the accessor and/or code which s/he writes to statistically pseudonymize and profile the user with that of the patterns/types, etc. of code s/he has written in the past, thus predicting even without explicit identification who is the likely author and what s/he is like, i.e., what is the statistical probability distribution of the individual to each of a variety of previously known identities based upon code morphological characteristics, functional behavioral features, human behavioral features (e.g., if it is accompanied by a human attack). Pseudonyms and resolution credentials may be useful to authenticate the basic intent and MO of the author of the code while use of cryptographically interoperable pseudonyms, i.e., multiple unique but single identity aliases which are linkable to that single author only by SDI-SCAM for its security analytical purposes and under prescribed conditions (as data disclosure policies) as dictated by that author. Pseudonyms may be used to insure the same level of anonymity of the author as uncredentialed code. This approach could, of course, either be implemented as a local protocol (i.e., existing applications, application updates and new applications could all possess these credentials verifying/certifying that the present code was written by an individual who has been certified by a trusted certification authority as being non-malicious). This approach and the above pseudonym based identity protection scheme, while applied in this case to the application of software security are disclosed in detail for the application of identity protection, data privacy and security from rogue individuals interacting on communication networks such as the Internet. These relevantly related techniques are well described in the parent case as well as in U.S. Pat. No. 5,754,938, entitled "Pseudonymous Server for System for Customized Electronic Identification of Desirable Objects".

Within a typical context, this type of code certification should be impervious to a "man in the middle" attack. Such embedded messages (or in a similar cryptographic variation, "fingerprinting") are inherently effective for the security application proposed inasmuch as any rogue code which a system attacker would attempt to insert into a certified application or communication or other communication containing executable code would contain within its sequences continuous portions which do not contain the embedded credential-based sequences. Likewise, in case the would-be man in the middle attempted to remove certain data, (e.g., credentials or functional application code) the fingerprinting technique would recognize the specific extracted code segments. This exact same problem can be solved alternatively another way in which the primary objective is to transmit data containing a message the existence of which is not possible to be detected by a would-be "man in the middle" attacker. In the example approach in which a content bearing message is embedded or fingerprinted into the application code (or less desirably in an associated larger message), the message can only be identified by the recipient (the local SDI-SCAM agent) who may also be similarly hidden or "steganographed" as with the originally sent message (in order to verify receipt of the message by the authenticated recipient. There may exist in this content bearing message a variety of useful credentials incorporated therein including but not limited to credentials approving both authenticity, untampered state and authentication of the sender and/or author as well as proof of certified "good intent" on the part of the code author. The technique for insuring that the embedded sequences are completely undetectable, while at the same time being diffusely spread throughout the code is typically performed by using encryption techniques (e.g., pseudo-random sequences) to determine the positions of the sequence bits within the remaining code in order to thus pass a message to the recipient (the local SDI-SCAM agent) containing the credentials and potentially the message of the coordinates of the associated meaningful sequences, such that all of these content bearing sequences appear among the remaining code as random noise, including the portion of the message containing the encrypted coordinate data of which coordinate bits possessing the totality of the embedded or fingerprinted message can be found within the application. Alternatively, this message containing the coordinate locations of where to find the meaningful bits containing the content bearing message may be embedded within a larger message which itself appears to consist entirely of noise (which in and of itself lends the security of the embedded or fingerprinted message contained therein). The primary hurdle in this case is to enable the recipient to be privy to certain data, which is not known to a would-be "man in the middle" attacker namely where to look for the message, i.e., the coordinates of the meaningful data constructing the message. This "shared secret" between the sender and the receiver could be conveyed to each party initially by a (one time) physical distribution (e.g., contained within an application if it is physically distributed, such as on a disk, or visa vie the OS or CPU, etc. In one variation in which the dissemination of this message needs to be performed on a network wide level (or group level), the shared secrets may be physically distributed, once to all parties in a group and, subsequently, all parties would be able to instantly initiate communications with the security guarantees achievable through the presently proposed methodology.

Finally, it will be sufficiently obvious to one skilled in the art that the presently proposed methodology has numerous potential applications in cryptography and data security and thus the means for distributing data coordinates to a recipient of a steganographed message for conveying (and if desired reciprocally confirming) a message is in no way limited to messages, containing credentials and authentication certificates about an author and/or sender. For example, the present technique could be very prudently employed as a means to distribute and replenish shared set keys within the context of U.S. Pat. No. 7,350,069. It may also protect against man in the middle attacks against distribution of private keys in Pki protocols.

SDI-SCAM Network

There are multiple network morphologies possible. Major configurations include the following:

1) Local network: SDI-SCAM enabled machines may form a local network, such as a LAN or WAN. Gateways to external networks (such as the Internet) can be fully controlled through SDI-SCAM enabled routers.

2) Open network: On the other hand, SDI-SCAM enabled machines can be connected directly to outside systems (such as a desktop system connecting through a generic ISP), but which maintain communications with a chosen neighborhood of other SDI-SCAM enabled machines.

3) Centrally organized networks—In this configuration, thinner SDI-SCAM agents are placed on individual nodes; these agents continue to be responsible for direct security and repair, but transmit gathered traffic information to central SDI-SCAM servers containing dedicated hardware and software capable of swift and very in-depth analysis of the gathered information.

4) Distributed networks: In this configuration, each SDI-SCAM agent shares the responsibility for traffic data analysis and the generation of preventative measures with other agents. A peer-to-peer morphology would work well in this case.

Inter-Agent Communications

Although there is clearly a benefit for agents to fully pool all information, it may be desirable to control both the content shared and the partners with which a particular agent is allowed to interact. These parameters can be set at the local level according to users' preferences.

SDI-SCAM agents may in fact negotiate with each other depending on the value and sensitivity of particular information, as well as the value of any likely synergies between them. Multiple agents may meet in virtual information sharing marketplaces.

Another level of security can be gained through the exchange of obfuscated, but still valuable, information. Such randomized aggregates would allow systems to share fundamentals without revealing details of their particular data (for example, agents could share times of attempted log-ins without revealing the associated user ids and failed passwords).

In more complex realizations of this system, associated groups of agents may form coalitions, with information shared freely internally, but shared with conditions externally.

A further feature is that communications between agents need not be perfectly symmetric—in other words, different agents may send and receive different sorts of information. This might apply, for example, to a centrally organized SDI-SCAM network: outlying agents would have no need to transmit detailed traffic data to each other, but would rather transmit it directly to a central server. The central server might communicate with other central servers, in which case it would transmit high-level information relevant to the processing of the entirety of the traffic data; on the other hand, when communicating with outlying nodes, the central server might only transmit simple virus protection instructions and metrics which are substantially devoid of any data which suggests what types of information, attacker strategies or applications are running on other nodes on the system which are outside of the network of nodes and which are currently trusted by the nodes from which the centrally collected and processed data had been acquired.

Furthermore, there may be an additional or alternative approach to guaranteeing absolute data security at a local network or machine level while enabling maximal or complete harnessing of all of the statistical knowledge, which is present across the entirety of the network. In this approach it may be possible to operate SDI-SCAM or certain particularly sensitive portions of it with its multiple agent architecture as a singular trusted, yet distributed multi-agent system. In this variation, all of the locally performed or assigned agent functions are assumed to contain sensitive data belonging to external third parties and thus all processing activities, data communications with other agents or the central SDI-SCAM server occurs within a secure trusted and untamperable environment such that the only knowledge ultimately accessible by any given agents, associated local server or network on which it physically resides may be the collection of executed functions which are performed by the local agent on behalf of the SDI-SCAM to protect the local system as herein disclosed.

The order and way in which agents communicate with each other may be highly conditioned on the particular nature of a given system. Criteria include (but are not limited to) the following:
  overall vulnerability of a system;
  importance of the system to the integrity or functioning of a network;
  sensitivity and value of the data stored on a system;
  probability that the system has already been compromised or damaged;
  characteristics of the network traffic going to and coming from the system;
  overall importance of a system to a potential or identified hacker or specific system subcomponent.

This may dynamically change from moment to moment and is predicated by a probabilistic estimate determination variable of the intruder, whether autonomous or human and/or by human expert based estimates who are ideally familiar with local competition (or enemies) and broad knowledge of what types of knowledge on the system would be most of interest to which other entities or individuals and for what reason. If an individual is specifically identified this statistical model may further borrow and integrate techniques disclosed in co-pending U.S. patent application Ser. No. 11/091,263, filed Mar. 26, 2007.

Updates and communications between agents (termed "polling") may be based on schedules or on circumstances. For example, a remote agent may be updated with new antiviral software once a month; however, if any other node on the network is attacked, the schedule is suspended and an immediate update is performed. Certainly even if an attack which, for example, has only begun to occur or which has not even positively been confirmed as yet, triggers SDI-SCAM's system alert feature, other nodes on the network most preferentially/urgently those which are physically proximal or in other ways similar may also be put on alert status and SDI-SCAM's repertoire of protective features may be triggered so as to begin operating at a heightened level of defensive activity. As indicated, there may be a range of different system defense levels corresponding to a decreased probabilistic likelihood of a threat and the likely severity thereof should this threat exist. Local system administrators are notified appropriately as well. Determining the likelihood that a threat upon a particular node or network will also be carried out against any other given node can be predicted by such variables as commonalities at an organizational or strategic level, data communication occurring there between, commonalities in the existing or perceived data on applications contained or functional objectives achieved upon that node, presume interest level that a potential intruder of the attacked node or network may also have with the other node, etc.

Polling priority may be based on calculated likelihoods: for example, if various factors indicate that the probability is high that a remote node has been infected by a particular type of virus, the central server may be put into immediate communication. Polling priority will also depend on the nature of the nodes and the way in which their agents have been seen to communicate. U.S. Pat. No. 5,754,939, entitled "System for Generation of User Profiles for a System for Customized Electronic Identification of Desirables Objects" may be used as the basis for optimizing the way in which polling is performed.

Illustration

Figure 1:
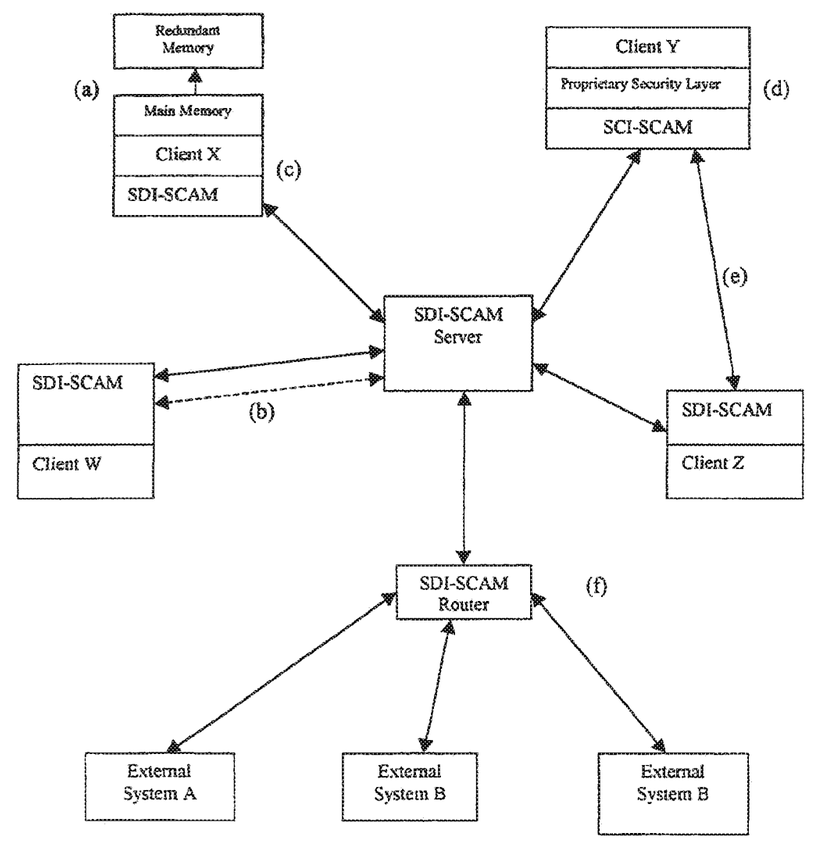

FIG. 1 provides an illustration of some of the configurations discussed here.

Analytics

Given the number of different security objectives, as well as the number and diversity of possible agents and network configurations, a fairly broad range of analytical tools are employed by SDI-SCAM. They include, but are not limited to, the following major categories of analysis:

Methods to Detect and Classify Direct Intrusions

Direct intrusions are attempts by unauthorized entities to enter a particular system, either over a network or through local terminals. These can range from fairly unsophisticated attacks (for example, teenage "script kiddies" using standard public domain software to scan for open ports across a list of target IP addresses), to extremely skillful attacks that are focused on a very particular target (as might happen during corporate espionage).

Since SDI-SCAM agents are able to dynamically monitor and analyze as well as control all in-going and out-going traffic, they are in a good position to detect and counteract such attacks.

1) Attack Patterns Consistent with Previously-Observed Patterns Across the SDI-SCAM Distributed System.

Each SDI-SCAM agent has access to a shared database that contains the signature patterns of previously observed (as well as verified) attacks. The likelihood of these events having been actual attacks may be probabilistically estimated so as to optimize the precision of SDI-SCAM detection/diagnosis as well as countermeasure deployment system modules. Such patterns might include the use of a particular password list, log-ins at particular time intervals or frequencies or times, log-ins from suspect IPs, (and/or combinations thereof) constitute a few of the straightforward examples.

If such a pattern is detected, the resident SDI-SCAM agent may opt to deny all entry to the IP of the incoming log attempts, or it may opt for a more sophisticated defense, such as opening a "honey pot" trap, a virtual space that simulates the environment of the system that is being protected. The hacker, believing that he has actually broken into the system, can then be monitored by SDI-SCAM, as his behavior might give clues to his location, identity, and motives and incriminatory evidence, if desired. Assuming the hacker has learned (or possesses) enough knowledge about the system to detect "honey pot" traps it is advantageous and precocious to possess at least equivalent knowledge regarding SDI-SCAM to possess at least equivalent knowledge regarding its own environment and to be able to enable the system administrator access to that knowledge as well as (via SDI-SCAM) knowledge known or suspected to exist within a probabilistic context regarding the hacker or threat and its strategy and/or this knowledge may be acted upon appropriately by SDI-SCAM in automatic mode. Invariably all counter measures (such as honey pot traps) used by SDI-SCAM can be used to the advantage of the hacker if s/he is aware of the strategy of SDI-SCAM to monitor, model, locate in order to ultimately catch him/her.

2) Utilizing Data Modeling to Adaptively Learn and Recommend Appropriate Countermeasures Implementation of practically viable automated countermeasure scrutinization and recommendation scheme is quite achievable:

a. If the conditions/parameter triggers are simple and unambiguous, and b. If the system administrator is notified and able to intervene while exploiting the system's analytical knowledge and system-generated recommendations and scrutinies by the system on behalf of his/her chosen response decision.

In the ideal scenario, because rogue attacks are capable of performing increasingly effectively against system security protections (in addition to being more sophisticated and expeditious) and especially with regards to leveraging the system's own abundantly capable resources, it may be ideal as a complementary measure to building redundancy into the system resources in the interest of expediency of decrypting a counter measure, to also immediately respond in automatic mode, then solicit the active, albeit system-guided intervention of the system administrator whereby more significant decisions can be perhaps more confidently and prudently executed (e.g., whether or not to delete potentially corrupted files/portions of system data at the server or network level), whether to guarantee a certain portion of the network but allow certain essential functions to continue for the time being without code exchange, whether or not to attempt to infect the hacker's machine (or analysis code into the virus itself) which may provide additional detailed information as well, etc.

3) Novel Attacks

In some cases, attacks will follow completely new or novel patterns.

Such attacks can be detected in different ways. One solution is to configure a Bayesian network to constantly gauge the probability of an ongoing attack by monitoring network traffic activity (this configuration can be done by human experts and/or through machine learning techniques). A variety of factors can be extracted from the network traffic across all SDI-SCAM agents in the local network—for example, the number of failed log-ins, the identities and IP addresses of those users attempting to log in, the importance, sensitivity or "value" (more specifically "perceived value") of particular target files or contents potential adversarial entity or prospective hacker, etc. These factors are fed into ongoing probability calculations, which may trigger a system-wide warning if a certain threshold is surpassed.

Keystroke monitoring virus must be mentioned since it is impervious to NORTON™, etc.

For example, suppose a ring of corporate spies tries to hit a company's network simultaneously. SDI-SCAM agents across the network will report the use of unauthorized passwords originating from the same IP or IPs to which associations have been constructed via SDI-SCAM based upon historical statistics if the probabilistic likelihood of such events occurring independently might be so unlikely that the Bayesian network would immediately increase its estimate of an ongoing attack.

4) Attack Warnings

Note that in all cases, when an attack is suspected the resident SDI-SCAM agent will immediately alert all the other SDI-SCAM agents in its network neighborhood, sharing all traffic information relevant to the on-going security issue. Such warnings will include information related to the particular nature of the problem, in particular the probability and nature of the threat (for example, communication with an unsecure system, access by an authorized user, reception of potentially infected files, etc.).

When an on-going attack is announced, SDI-SCAM agents receiving this information may opt to increase the security levels of their own systems. For example, users may be required to telephone at the time of their log-in to verify location (through caller ID) and voiceprint.

Methods to Detect and Classify Viruses or "Trojan Horses"

Origins, possible paths of transmission across sites, etc. types of files (e.g., particularly vulnerable or vulnerable origin site), may be analyzed to provide ideas as to how to use this data to make a vulnerable application, Trojan horse attempt impervious, make rogueness, crypto query, even rewrite code.

Another vector of attack is through viruses (which are often unauthorized and malicious programs attached to files, email, or documents) and Trojan horses (seemingly innocuous programs that contain hidden programming capable of causing damage).

Code Analysis

The conventional viral detection methodology is to scan the code (in the case of executable modules) and macros (in the case of smart documents, such as those generated by Microsoft WORD™) for patterns that have previously been associated with viruses or malicious programming.

SDI-SCAM maintains up-to-date records of all known viruses and checks all incoming files (and periodically, all stored files) against these records. A match indicates that a file is potentially infected—the user is alerted of the danger and automatic defensive measures may be set into motion.

Behavioral Analysis

SDI-SCAM monitors all processes for behavior consistent with viral infection. For example, a program that is observed to open and modify a wide range of heterogeneous files, which accesses the mail system's address folder, which aggressively propagates copies of itself, which engages in recursively redundant actions whose objective is designed to achieve no useful purposes or frequently which aggressively/repetitively generates or obtains data files in order to propagate inordinately voluminous and/or large files (possibly including itself) resulting in bursts of traffic (thus overloading valuable network transmission capacity), which performs similar recursively redundant actions resulting in consumption and overloading of valuable processing capacity, which modifies or mutates its own code (and/or behavior), or which opens unexpected communication ports with outside entities will be flagged as a potential threat. Unquestionably, SDI-SCAM's highly distributed data traffic monitoring and behavior and code analysis facilities as a combined approach give it a marked and compelling advantage in rapidly analyzing those behavioral patterns and characteristics most commonly associated with a rogue code such as viruses, Trojan horses, worms, etc. whose tell-tale signs could not be identified nearly as expeditiously as that of SDI-SCAM's distributed agent monitoring architecture. Such commonly occurring signatures which SDI-SCAM's distributed Bayesian methodology is particularly well suited includes those patterns of self-replication and dissemination through address books, email, web browsing sessions, etc., as well as the co-occurrence of identical or related patterns of behavior and code sequences in conjunction with these replicating and self-propagating patterns as observed only on a network level. Certainly part of this behavioral analysis may encompass attempts by SDI-SCAM to classify the identity or type of virus based upon all of the above observed characteristics as well as attempting to extrapolate its high level objectives and associated executable rule sets based upon its behavioral patterns associated with the conditions/variables of the environment which it has encountered, the data which it has likely accessed, the actions, events and countermeasures to which it has been exposed, the code within which it has likely been embedded, etc.

Although it may be difficult to delineate rogue from innocuous code it is certainly within the scope of capabilities of SDI-SCAM to utilize all of the available data, both behavioral and code sequences, in order to attempt to reverse engineer the code for the purposes of both predicting its future behavior, likely past behavior and high level objectives. For example, SDI-SCAM could replicate the code inside of an environment which is quarantined from the network, but which is a replica of the network or a portion thereof. SCI-SCAM could then monitor how the code behaves in this simulated environment to the actual one as well as observing its response to targeted stimuli, which may, for example, provide opportune conditions for the most likely rogue actions to be performed. This analytical procedure may be performed in response to a predicting statistical model (designed to predict the code's behavior) when a decision tree could be used to dynamically select the set of functions to be executed which based upon the same model are correlated and then predicted to elucidate responses on which are the most optimally revealing, reveal the most revealing which is needed to complete the construction of this data model for the codes for being able to predict the code's behavior across a wide array of conditions, actions, software and data to which it may ultimately become exposed within the entirety of network(s). In depth analysis of potentially suspicious code although challenging as it may be could potentially provide system level insights into how to best respond to the potential threat and if mandatory the nature and aggressiveness of countermeasures to be taken or recommended to the appropriate human system security counterpart.

The user will be alerted, and if he confirms that the program is operating outside of expected parameters, or if the user does not recognize the program, it is taken offline until it can be examined in detail by an expert.

Dead-Ringer Analysis

Although not currently a threat, it is likely that infectious programs will be able to simulate the behavior of human users. A suite of behavioral response tests can be developed to detect and counteract such entities, e.g., a probabilistic model based upon other previous threats in the statistically similar characteristics (including behavioral characteristics and certainly those determined to be the most likely to be the same). Queries which may be required of the "user" to be answered correctly or to perform a task (e.g., compose a block of text on the basis of a query) in order to proceed could be solicited of the user which are crafted such that an emulating virus would likely fail such query procedure. Moreover, Natural Language Processing methods can be used to analyze outgoing text for irregularities consistent with a non-human origin. It is possible that in a similar fashion, that, in theory very smart emulations of existing code could be manually or even automatically on the fly created which emulates in many respects existing "good code", but which actually is designed for malicious objectives or, for example to take over control of the good code or replace it with the rogue version. As additional attributes of the system, the system may determine probability and degree of ill motive of individuals of most likely suspicion (if such suspicion is high enough to be of reasonable concern). Typically, common suspicion of particular individuals can be linked to unscrupulous employees (present or former), disgruntled employees, disgruntled spouses of key persons/owners (e.g., changing files, information release, etc.) to embarrass or defame the person or to feign a verbal or tactical attack on a friend, associate or colleague. Such "suspects" could also include trusted partners who may be confided with knowledge of the existence of unique information which could be of interest directly or could even help or strengthen that party in its business position with its "trusted" business partner.

Control of Triggers

If the probability of an infection is deemed to be high, SDI-SCAM may control the generation of events that could potentially trigger the reaction of a resident virus. For example, if a bank suspects that a corporate virus has infected the system, all transactions may be suspended until the virus is cleared. Otherwise, the action of a user requesting an on-line transaction (thereby releasing his personal password to the system) may trigger the virus into capturing and re-transmitting his personal information.

Tracing Threats Back to their Original Source

In traditional system security techniques this objective is highly desirable and yet extremely difficult. Nonetheless, SDI-SCAM's functional features lend themselves quite well to the design of certain particular types of applications, which can be useful in addressing this particular problem. For example, the following example applications may be herein considered:

1. "Infecting" the Hacker's Machine (or the Virus) with a Virus, which Logs and/or Conveys Back to the SDI-SCAM Agent the Location, Behavior, Files Infected as Well as all IP Addresses of the Machines in which these Files Reside.

This approach is likely to work provided that the implanted virus by SDI-SCAM is not recognized by standard virus scanning software or other IDS systems and assuming that the receiving machine is not programmed to block any outgoing messages. Thus, the success would be determined in part by the effectiveness of the virus to take control of the adversary's (or rogue virus containing) machine. This type of direct analysis will both enable preemptive alerts of exactly where the virus may be spreading to other machines and/or networks as well as provide valuable statistically confident data as to the function, behavior, data or code affinities and behavior in response to infection of the same as well as epidemiological characteristics which could be extremely valuable as to anticipatory determination and qualification of the associated threat on other machines, as well as the most appropriate countermeasure each local agent should implement or receive in response. Certainly, this approach could be useful for viruses, which possess particular rapidly proliferating characteristics, rapid infliction of destructive behavior. For example, one could imagine the behavior of more sophisticated viruses which might proliferate themselves as redundant messages so as to rapidly overwhelm network capacity and/or memory processing and/or implement parallel strategies.

This approach could also enable SDI-SCAM to model not only future epidemiological characteristics of rogue software but also that of post epidemiological behavior (which machines or networks were likely to have been infective previously based upon presently known epidemiological characteristics) and the devices/networks which are known to be and probabilistically suspected of being infected by the same virus (or mutated variant thereof). Certainly reconstruction past, present and future behavior in this regard could be relatively easy to perform for worms that may require access to ISP server logs for other variations which may use email and web server connections as a medium of transmission. A protocol also may allow for the existence of a latent tracking virus to reside within all machines which can be, in the case of significant probability of a threat in and among a network community or otherwise "group" an excessive probability of a threat, the tracking virus may be remotely activated by a multi-casted activation message originating form a core (or root) server.

2. Use of SDI-SCAM Architecture for Application Level Security

It will be increasingly important in the future for many of the functions of SDI-SCAM as implemented within the context of its presently disclosed distributed statistical analytics to be implemented not only at the level of a distributed network security system but also at the individual application level. That is to say that SDI-SCAM agents could, in addition to the above described system level implementations, also implement their various functions for data collection, analysis, and countermeasures at the application level as well both to implement other application level security protocols as well as incorporate into the statistical analytical scheme probabilistic attributes regarding the behavior functions, etc., of such rogue code within the context of the particular relevant applications in need of protection, albeit using the same distributed adaptive modeling and countermeasure response protocols described herein in comprehensive fashion.

Methods to Detect Tampered Files (Semantics and Content)

It is sometimes the case that intruders, rather than destroying or removing files, will simply alter them in potentially malicious ways. For example, students may attempt to hack into their school system in order to change grades, or a more advanced hacker may attempt to break into a bank to fraudulently increase the balance in his account, into tax or criminal record databases in order to change tax liabilities, records of property ownership or criminal records, into professional board's databases in order to change licensure status. Similar tampering may occur to files whose contents may relate to the hacker (e.g., employee files of present or past employers). Malicious code may, in theory, perform all of the functions that a human may perform, perhaps, however, potentially even more unobtrusively and elusively in that it may be more difficult to trace and flag than a human if the code is very small, robust and capable of focused but sophisticated emulations of legitimate applications and users.

In addition to the above suggested techniques for use in tampering detection and ultimately prevention (or even tracing the origins of tampering attempts), there are other straightforward IDS-based approaches by which such attempts could be countered (and could even complement the above safeguarding scheme, for example, in terms of being a default detection scheme and/or in corroboration of the presumed integrity of credentialed individuals). Thus, the following IDS-based alternative technical approach is also provided as well. The local SDI-SCAM agent maintains logs that detail the general characteristics (size, word count, hash code) of all documents on the system. The time and circumstances of any changes are cross-checked against average traffic patterns for that particular system. Hence, school records altered at 3 am (in a district where all school secretaries worked strictly from 9 am to 5 pm) may be flagged as potential objects of tampering.

Tampered files will sometimes show a marked change in writing style or technique. Natural Language Programming (NLP) techniques may be used to detect such changes. Certainly in the event of these suspicious activities and other conditions, it may be advantageous to retain not only the associated statistical data (as the SDI-SCAM does automatically) but also details regarding the events. This could, for example, be later analyzed by humans to compare with other similar suspicious patterns also captured in detail in order to attempt to identify patterns, more subjective signatures, or hall marks which may not be able to be performed automatically (such data may also be useful for potential legal evidence).

Methods to Detect and Classify Untruthful Commercial Messages

Untruthful messages represent a more traditional kind of deception—the technology of the delivery is not damaging, rather, the content of the message itself is untruthful and may prove harmful if taken at face value by the receiver. A good example of this is the "Nigerian Scam," a widely disseminated email that purports to be authentic, asking the receiver to give the sender access to an American bank account in exchange for great financial reward. The result, of course, is that the receiver ends up being defrauded of large amounts of money.

1) Cross-Checking Content Against Known Hoax Documents

SDI-SCAM maintains a database of questionable messages and uses natural language programming-based techniques to compare incoming messages with previously logged deceptions. Thus, when a suspicious message is detected, the receiver may be sent a secure attachment by SDI-SCAM with an email stating that there is a high probability that the mail is untruthful, and indicating pointers to web pages that discuss that particular deception. If a user is nonetheless deceived by such a message, the local SDI-SCAM agent may be alerted. It will transmit the text of the novel message to a security database, allowing every other SDI-SCAM in that network neighborhood to be aware of the danger. In such a case, the agents may retroactively warn users by scanning old emails and alerting receivers of possible deception.

Certainly in such an event, autonomously implemented counter measures may also be performed if appropriate as a defensive or evasive action or deterrent, e.g., if a pass code was inadvertently sent out (and it was not blocked by the system) the pass code could be automatically changed or temporarily frozen or if a personal bank account or credit card number were sent out in a suspected inappropriate context (again assuming it was not blocked at the source by the system), the account could be automatically temporarily frozen and the number changed or (for example) the account automatically set up as a honey pot trap to acquire just enough information about who the suspect entity is in order to catch him in an inappropriate act of fraud or deception.

2) Predicting Possible Hoax in Novel Message

In cases where a message is not closely correlated with known hoaxes, it is still possible to analyze (using natural language processing techniques that are currently well known to the art) the content of the message and flag any suspicious content:

- the content of the message can be cross-checked against recent news stories discussing hoaxes; and.
- the names and return email addresses of the incoming mail may be checked against those of known hoaxsters.

Automated semantic analysis of the message may be performed for language consistent with persuasion or appeal to greed (or other weaknesses). This analysis is performed on the basis of adaptive rules which may be updated with feedback.

The identity and personal profile of the receiver may be correlated with the characteristics of known victim groups. For example, messages sent to rich elderly individuals may be given additional scrutiny.

The purported identity of the sender can be checked against the path of the email. For example, a message claiming to be from the IRS should trace back to an official government system.

A probabilistic assessment of the likelihood that the sender is fraudulent may be performed through a modified version of the system described in co-pending U.S. patent application Ser. No. 11/091,263, filed Mar. 26, 2007, in which the system's probabilistic determination of predictive attributes relevant to an association with fraudulent, unscrupulous or disruptive behavior (in an on-line context) is performed—of course, the sender if self-identified may also be fraudulent. The on-line sender just prior to the first receiving node on the system may also be analyzed which is a reasonably reliable tracking means if SDI-SCAM is a ubiquitous protocol (e.g., for patterns of being the origination node for previous problematic messages and/or the techniques disclosed in the same co-pending patent application), whereby the system may probabilistically predict the suspicion level of an individual(s) or organization(s) associated with that sender as being linked to other scams and/or other illegitimate or questionable activities. Related techniques may use other advanced customized semantic analysis and/or adaptive rule based/statistical techniques (preferably in combination) in order to estimate the degree of potential harmfulness of the content.

Because SDI-SCAM's distributed agent and sensor network perform consistent detailed surveillance capable of monitoring across a diversity of different heuristics, it is possible to monitor for early patterns which are indicative of an attack which may be quite sophisticated either of a large-scale nature or which targets a specific type of system and therefore which may tend to go undetected (e.g. visa vie its hardware, operating system or possibly software) but may be destructive to very important systems like control systems for critical infrastructure. These detectable patterns may be based upon experience of the agents (to previous known threats) and unknown threats e.g. detecting patterns which are not normal but not definitively linked to threats of a previously known nature. Certainly fuzzy probabilities analyzing of combinations of these condition states will be able to fine tune triggers for potential alert states which are matched appropriately e.g. balancing potential threat to the possibility of variations of normality to the real degree of threat and given the degree of importance of early detection and response given the overall importance of the systems at hand and the predicted virulence of the threat that the detected pattern presages.

Thus with regards to specialized systems and networks, certain specialized patterns corresponding to the type of end result that the attacker may like to achieve may be preprogrammed into the system even if such novel attack had not occurred previously. If there were infections of specific types of operating systems or software or hardware which also corresponded to certain of these components that existed in critical infrastructure it would be cause for concern that such a threat (e.g. a worm) may in fact already exist for purposes of attempting to target such critical infrastructure. This is one reason that redundant components of this type which may be placed on the network or even assembled into analogous system architectures may be useful in pre-emptively becoming targeted (as "bogus targets") for purposes of early detection and characterization of the threat before it actually targets its intended critical system. This is just one example of many techniques and strategies which can be used by SDI-SCAM to complement its ability to utilize its distributed sensors to identify and characterize potential threats either at the very onset or even before they occur or certainly as they are emerging and beginning to spread. Again the nature of the automated notification, additional defenses and/or remedial counter responses may be both targeted to the threat, to the targeted and/or vulnerable systems as well as to those where SDI-SCAM is able to predict the spread is most likely to occur, e.g., based upon commonalities of various sorts such as communication links, business/commercial affiliations or social profiles, etc. On traditional networks in monitoring for potential signs of large-scale attacks experiential knowledge must be of course heavily weighted. There are a growing variety of and new variations of such threats. However they tend to fall into general categories for which significant experiential data can be accrued.

The content may be corroborated with the content of known and trusted documents, e.g., through the use of content matching techniques. More elaborate extensions of this approach may include more advanced semantic analyses of the subject content with its credible and updated/current matching counterparts whose custom algorithms are custom configured to confirm (or alternatively flag) or assess the probabilistically estimated "truthfulness" of contents (where "truthfulness" may be reassured according to "confirmed with credible source" as well as scalar measures of degree of likelihood of untruthfulness if the source is unconfirmed or, for example, exhibits semantically suspicious inconsistencies with itself, with credible sources or other patterns which are consistent with fraudulent or deceptive material).

The system may also detect suspicious content, for example, if its appearance co-occurs in the same message with rogue code (for example) is co-located (in the same portion of content) as a macrovirus.

Methods to Repair Post-Attack Damage

In some cases, despite the security, a system in an SDI-SCAM network may be damaged by an attack. If the attack is completely novel, a human expert may be called in to fully analyze the situation and develop appropriate repair protocols. These can then be sent to a central SDI-SCAM damage-control database for use in future situations. In this way capturing as much data and statistical information regarding the attack and its historical counterpart is valuable both as analysis data for the human or to enable the system to construct its own optimal repair protocol.

If an attack method is not novel, the local SDI-SCAM system may access this same damage repair database for solutions to the local problem. Among the remedies to damage from an attack: users are alerted, suspicious files are deleted, backup files are loaded, and current memory is completely cleared and reloaded with an image from a pre-attack state.

Additional Embodiments

The inventors further propose a scheme in which a Server provides security and validity information about free online software that can be downloaded off the web. The Server keeps a score that is made up of three components. The first component is computed based on the security of the software itself. The second component is computed based on the experience users have with the program. The third component is based on the reputation of the programmer that created the program.

Component 1: The Security of the Program

In order to make sure that the program does not violate the computer onto which it will be downloaded, the Server will perform tests on the program the check if the program never accesses memory locations that it is not supposed to. Such tests will ensure that the program never reads data that is private on the client computer, and does not write to forbidden locations and thereby self-replicate itself. Our tests will also detect if the program has memory leaks using state of the art techniques, to ensure that the program does not launch a denial of service attack on the client computer in this manner.

Our testing environment will run the program in a sand-boxed environment to detect illegal memory accesses. One of the novelties of our testing approach will be to generate test inputs with large coverage to ensure that many of the program's computation paths are exercised. We will do this using a two-pronged approach. Random testing will be used to catch problems in commonly exercised paths. However, pure random testing will fail to exercise the corner cases with high probability. To account for that, we will perform symbolic execution that constructs a logical property characterizing the exercised paths. The SAT solvers will be used to generate inputs to exercise paths that have not been explored. Finally, to detect potential memory leaks we will run garbage collection routines periodically. Since all our tests will be performed before deployment (and not on the client computer), the overhead incurred due to the sand-boxed environment, the symbolic execution, and memory leak detection, will not affect the performance of the program when it is used by clients.

Digital Signatures

Once the software is checked for security it is vital to ensure that only this version of the program will be downloaded and not an altered version. Therefore, a digital signature will be created for the software. The digital signature can be stored on the Sever and used along with a public key to verify that the software is indeed the original one that was first tested. The signature is much shorter than the program itself so checking it is much more efficient than comparing two copies of the entire software. It is secure based on some cryptographic assumption in the sense that if some bits of the software are changed than the signature will not be valid.

Component 2: User Experience

It is possible that even with the secure checks that will be made in Component 1, the software could be hacked after the download. In order to detect such problems, in Component 2 the Server will keep a score based on the responses of users of how well the software worked for them and whether they found any bugs or not. It is important to ensure that only responses of credible users will be used in the score calculation.

How do we Alert all Users if a Program has Complaints?

The approach we discuss here is based on a distributed agent-based model for network security as discussed above, which describes a distributed multi-agent system for real-time collection, monitoring, aggregation, and modeling of system and network operations, communications, internal and external access, coded execution functions, network and network resource conditions, as well as other assessable criteria. A Bayesian model is used to estimate likelihoods of various threat vectors. The model provides access to the reasoning behind its inferences. It may recommend or in some cases even implement responses to detected threats.

Component 3: Programmer Reputation

The Server will keep track of the identity of the programmer who created the software. Each time the software gets a good score from user's responses and from the security of the code the rating of the programmer will go up and this will be linked to all the different software that the programmer created.

There is an incentive for a programmer to create a user name that will be used for all the software that he creates. This way his reliability score is increased and his software will be more widely used. Even software that might be new that might not yet have a wide range of user responses in Component 2 will benefit from being linked to other software with high rating from the same programmer.

If a programmer chooses to hide his identity from the software then there will be no score for Component 3 for this particular software. Therefore, there will be incentive for a good programmer to associate his username with the program.

If a programmer chooses to identify himself with the software, then there are two possible ways to verify the identity of the programmer. One is to identify the software with an identity such as an email address or another created user id. With this scheme a user may create different user identities for each software application that he creates. In this way the software will not benefit from being linked to other software created by the same programmer. Therefore there is an incentive for an honest programmer to use the same user id for all programs. The programmer usernames will be handed out with a password so different programmers will not be able to obtain the same user-id. Therefore, a malicious programmer will not be able to link his software with the credibility score of another programmer.

A programmer that creates many programs will have further incentive to invest more time to create a Unique user id for which the Server requires paper identification such as a notarized copy of a driver's license. A programmer has the incentive to obtain such a Unique id because only one will be given to each programmer. Therefore, the programmer cannot create different programs that are not linked to this. If there is a virus in one of these programs then all the programs of this programmer will be given a bad score in either Component 1 or Component 2. Additionally, it is possible to trace the programs back to the programmer. Therefore, users looking for utmost credibility will look for software where the programmer identified himself with this Unique-id.

How do we Decide which Programs to Use?

A programmer may request to add his program onto the Server. Additionally, a user may request to add a program onto the site. The program does not need to be stored on the server. Only the signature can be stored on the server and as long as the program that can be downloaded from any site can pass the signature test it can be used.

Those skilled in the art will appreciate that this embodiment whereby a Server provides security and validity information about free online software that can be downloaded off the web can be implemented either as part of the SDI-SCAM system described above with respect to FIG. 1 or as a standalone scheme for improving computer security using the proposed credentialing scheme.

Whitelisting

This section highlights the value of leveraging the knowledge accumulated by the distributed agent of SDI-SCAM which particularly helps to overcome the limitations of whitelisting which in present day implementation is limited to a small fraction of the actual, but non-verifiable whitelist. Whitelisting particularly in the context of SDI-SCAM's probabilistic assessment of individuals, code, servers and user machines is a form of reputation system. Explicit whitelisting where a user is granted permissions to access certain servers or files or where they are considered safe individuals, machines, servers or code may, however, be used along with (or alternatively to) implicit whitelisting where such whitelisting functions are provided by SDI-SCAM based upon a probability distribution curve of safety or appropriateness of access (to typically specific programs, servers or machines) based upon matching or exceeding of a "safety threshold." The widely distributed agent based monitoring not only is capable of observing the large universe or network of networks but does it in a continuous and updated fashion. The non-whitelisted item would traditionally be "unknown" with the possibility of being unsafe or part of a black list in contrast to what is possible through the newly proposed paradigm in which what is not whitelisted has a very high probability of being unsafe.

Thus, in a global implementation of distributed agents, non-whitelisted machine and users, for example, could be for practical purposes effectively considered "unauthorized" in similar fashion to unauthorized "accessors" similarly for code or programmers in a closely monitored secure network. Compared to all known prior art counterpart systems, the use of a distributed sensor network to aggregate and provide means for data analysis and adaptive rules for modeling and predicting existing, emerging threats and threats which are yet to occur are particularly useful in early identification and prediction of the anticipated threats including anticipating severe threats (urgently warranting notifications and warnings), quantifying and/or characterizing servers, user machines, code, software and individuals regarding the present or predicted threat and revealing the likelihood of the threat (and/or potential severity or sophistication thereof). This includes the predicted safety or threat level, of a given user machine, server, program (including the user's own). Predictive threat level if high may also be revealed by black listing an item by implicit determination or if low whitelisting an item by matching or exceeding certain thresholds thus complementing explicit lists regarding the same with much more comprehensive data available through the distributed network of sensors.

In terms of one of its high level objectives SDI-SCAM strives for a comprehensive approach to higher efficiency computer security through the automation of these computer security processes. Thus, it is also useful to consider how it may be possible to improve not just the clarity in identifying and characterizing attacks and rogue activity but also how such information may be used to practically enable more targeted and forceful defense measures and counter offense responses in such a fashion that because the actions taken are not based upon the assumption of the possibility of unsafe or malicious activity but rather a high degree of confidence if not certainty of such activity or intent. While many types of defense and counter offense measures exist and are well known in the art, there is nonetheless a fundamental trade-off between implementing such defenses or counter offenses for the sake of improving overall security and/or creation of a deterrent and the overhead of implementation in combination with (most importantly) the additional time/effort and overhead navigating through those defenses and in the case of counter offenses the risk associated with launching the counter offenses against a non-malicious individual or machine. Because higher value servers that store the data tend to be the target of the more determined and skillful attacker, stronger defenses and counter offenses must be implemented for more valuable information and machines. Still, for the most part, these measures cannot be targeted because of the indefiniteness of the individual or program until it is too late and the attack has already occurred at which point typically even a counter attack is no longer possible.

As indicated, there are numerous types of defenses and counter offensive measures and it is clear that more targeted measures as a result of more definitive and confident identification and characterization of a true threat before the fact of actual attack will enable greater efficiency in protecting against or deterring threats and at lower cost and overhead. In the case of counter offensive measures there will be also much less collateral damage. Moreover, for this reason it will potentially enable much more common use of deterrent measures (typically counter offenses) be they human or automated by significantly revealing and characterizing the threat and leaving little question as to the intent to cause harm or steal information before the fact of the attack. Again, while there are numerous examples of how more common use of these measures under the widely distributed agent paradigm (ideally for these purposes an internet standard) there is listed a few examples of defensive and counter offensive measures below.

2. A family of security software which scan for software vulnerabilities and recommend security patches such as Protector Plus for Windows and Securia Personal Software Inspector. Clearly observational data generated across a large number of installations of any given software using distributed agents deployed to aggregate data, leverage relevant variables in a probabilistic model, test vulnerabilities in practice and develop probabilistic assessment of determined likely vulnerabilities would do a more effective and comprehensive job in the software vulnerability assessment, particularly identifying the more subtle or hidden vulnerabilities. Data mining and recommended testing protocols visa vie human in the loop approach is likely more effective than a fully automated analytic approach in this application.

2. Vulnerability exploitation prevention software, e.g., Malwarebytes Anti Exploit tool and ExploitShield—clearly by determining a more comprehensive profile of what existing vulnerabilities are present along with their characterization it is possible to better protect against their exploitation through a more targeted defense scheme. Again, the analysis of widely aggregated data and testing for each potential vulnerability is similar to that of item 1 above.

3. Performing direct counter offensive measures against an attacker—As indicated there are inherently significant risks of inadvertently attacking a machine which is not a threat, for example, by forgetting to add that machine to the white list. Even if the risk is small users will see the potential downside is greater than the upside. They typically will use instead basic encryption to further protect the file. In the distributed agent environment, observational data will allow the agent to recognize certain machines (e.g. via their machine code) as a non-threat (whitelisted by implicit versus explicit means) through their patterns of usage, e.g., files which tend to be shared (or similarly accessed by) whitelisted machines particularly those with higher security access permission will indicate at least the strong possibility that the accessing machine is not a threat and should not be counter attacked, but instead further investigated.

Another measure which potentially alleviates the risk of "collateral damage" to (mistakenly) non-threatening machines is to not destroy data or applications on the presumed adversary but rather to simply disable the machine, for example, using a counter offensive program which invokes the disabling function via the secure operating system. While a destructive virus, e.g., which wipes clean the hard drive is a fairly strong potential deterrent, so would be a program which locks the operating system until/unless the suspect attacker can prove to the owner of the targeted machine that the suspected intrusion was a "false alarm," that no such presumably intentional unauthorized access had occurred. If the legitimacy of the "intruder" can be verified to the target machine owner, a remedy (or vaccine) may be provided to the previously presumed attacker's machine. For example, it may involve the owner possessing a vaccine needed to eliminate the virus or to unlock the operating system which the virus had locked, which is, metaphorically, an "antidote" to the harmful side effects of an aggressive drug treatment. Thus, while the counter attack would be as harmful to the would-be attacker as a traditional destructive virus, it would be potentially immediately reversible and innocuous to a mistaken attacker (perhaps a legitimate intended authorized party).

In short, what is proposed is a counteroffensive measure (which may be but not necessarily a Trojan) which upon infecting or otherwise accessing the attacker's (or unauthorized accessor's) machine invokes the operating system to shut down. The victim of the original presumed attack holds a vaccine to reverse the operating system shutdown which typically requires that the original attacker prove that the access was legitimate or authorized and/or for the victim to verify that no harm was done on his/her machine or network. The privilege to use the code or tool to disable the operating system may be revoked by the OS provider if abuse is detected (e.g. using it as a mainstream attack strategy instead of a counteroffensive one).

How the direct counter offensive measure is implemented typically requires entry into the attacker's machine. SDI SCAM if implemented on an ISP server local to the attacker or even in the form of a virus which infects the attacker's machine may be able to learn about the attacker, his preferred targets, groups or other contacts or hackers which he may be directly or more loosely affiliated with will allow not only a detailed "snapshot" of the attacker but also the otherwise hidden activities, targets, timing patterns, etc., of him and his affiliates (if he does not work alone). This information may indicate whether the attacker is interested in data, and what type (s), and/or software and what type(s) (e. g., is it for the construction of a botnet?). If certain software is of interest perhaps he can be lured and baited to upload a Trojan masquerading as a program of potential interest. The same can be performed for certain types of user and server machines and regarding certain associated content (different ways files can be executable to masquerade as harmless data files). Certainly, detailed activity logs uploaded to the SDI SCAM network could be used to help warn known targets (or types thereof), individuals, system administrators, other (local) SDI-SCAM agents, etc. of potential attack, the type of attack typical of that attacker, vulnerabilities which tend to be exploited by that attacker and/or as pertains to the particular type of target user. For example, certain types of honey pot traps unique to the attacker could be set up. Of course, this information is useful in implementing defensive and counter offensive measures and may be delivered to the SDI SCAM agent on each user's machine. For aiding potential SDI-SCAM or locally deployed counter offensives such detailed reporting may include software and potential vulnerabilities associated with the attacker himself. Even if the attacker causes significant harm to such entities as governments, financial institutions, credit card companies and corporate databases through theft of valuable data (as opposed to software code) it is possible to create executable code which mimics certain file types, or even modify certain content or file formats with latent executable functionality, e.g., Word or Excel. Such files can be completely dormant (non-executable) and thus innocuous if within a "friendly environment" e.g., an authorized machine code of the accessor's machine is recognized or it may be detected as a potential threat or alternatively eliminated by the local virus scanner which may be tied into the SDI-SCAM system which in this case is fully aware of the fact of the file being used as "bait" for attackers. SDI-SCAM may have planted it as part of a targeted and timed counter offensive thus keeping accurate record of adverse threats and friendly threats as part of the overall and up to date status of existing and likely behavior of threats as well as the success statistics for certain defensive and counter offensive measures in view of certain types of sophisticated attacks and attackers.

Therefore Trojans (such as the above mentioned) as well as other approaches can be automatically recommended and implemented to targeted rogue machines in order to launch a counter attack to an intrusion and unauthorized access to data or software. Such files may be accessed from a honey pot trap or such Trojans may (again via SDI SCAM administration) be strategically selected and positioned within the network to maximize the likelihood of a likely attacker to upload the Trojan containing the SDI SCAM agent (technically-speaking, acting as a virus). For the counter-offensive variation, SDI-SCAM (or its human analyst counterpart) will tend to select or construct those files as Trojans within a given target machine which it deems most likely to be accessed (of interest) by the attacker given the total data profile collected about the attacker's elicit data consumption patterns and relevance feedback from trial and error implementations which will indicate the preferred files based upon past attack or consumption patterns, the files and types of files snarfed by similar attackers or which perform similar types of attacks.

In summary, using SDI-SCAM's distributed adaptive learning model not only defensive (as discussed earlier) but also counteroffensive measures may be recommended and targeted in response to a given threat or attack which is provided by the system based upon relevance feedback including trial and error from previously delivered responses to previous threats and attacks. Such relevance feedback may update the system's adaptive rule base and utilize automated and human in the loop adaptive rules via data mining.

With regards to the state of the technical art of creating Trojans which appear to be innocent data files, currently, there is a significant gap between files and executable files.

To do harm a file has to 1) be executable and 2) be executed. The latter requires that someone click on it or otherwise run it. This is very unlikely from a hacker who has snarfed the file from a target machine since he has no real incentive to run a captured executable?

There are only a few types of not apparently executable files can be executed—mostly Word and Excel files which are running VBA. It would be tricky to get a VBA macro that was able to figure out it was on an adversary's machine which is black listed or non-white listed (where in a global SDI-SCAM implementation is effectively black-listed) and then attack that machine successfully. SDI-SCAM's distributed knowledge may help here. Also, possible modifications to the file format to automatically invoke an execution, determine foreign, unauthorized machine environment, e.g. mac code and other clues matched against a list of authorized machines or white list (e.g., stored in upstream database). If a typical destructive virus was used, the maximum likely penalty would be the black hat would have to rebuild his box, not a huge deterrent factor. Unless the penalty was the virus' disabling the OS until/unless the presumed attacker could prove to the data owner his in fact authorization and/or non-malicious intent. Once word got out about it the tactic would become less effective until/unless adoption became fairly prevalent. Of course, designing the Trojan to look like an innocuous (non-executable) file format is another approach. The problem of its likely hitting innocent bystanders, i.e. laptops not preauthorized for the file but which should have been (e.g. destroying a vice president's laptop because he forgot to have a file authorized for his box) can be mitigated (again) by the use of SDI-SCAM to determine the likelihood of machines to be authorized for access to certain files (even if not explicitly) authorized. The default approach is to only encrypt the files instead of initiating counteroffensive measures. This of course, does not provide a deterrent and encryption keys can be stolen e.g. through break-ins and compromised digital certificates. Nonetheless, one of the present SDI-SCAM objectives is adapting the defensive and counteroffensive strategy by better selecting the response and making the response more targeted, confident and appropriate to the target entity, its actions and intervening circumstances/conditions in view of associated probabilities of all of the above.

For example, depending upon the value of the data (to the owner and attacker), the present circumstances, etc., SDI-SCAM can utilize its probabilistic knowledge as well as data as to the foreign environment (e.g. non-white listed) to determine the likelihood of a compromise of the encryption key thus possibly warranting the executable code associated with the file to prevent decryption e.g. by self-destruction of the file or for example, double encryption whereby the code holds the other second key which is obfuscated within other code or where the code (agent) sends it on a mix path (to be decrypted at a different server and returned) if and only if the environment of the initial accessor's (key holder's) machine is whitelisted or otherwise authorized.

4) As described earlier, the probabilistic model for SDI-SCAM's distributed agents does a much better more comprehensive and (most remarkably) a faster job at detecting patterns in software, behavior, sequences, etc., than could be achieved by other state of the art means like virus scanning software. Nonetheless, the fact remains that a lot of rogue software is new, evolving, difficult to detect (e.g., dormant) or maybe "normal" software with hidden vulnerabilities readily exploitable by hackers and/or malware. Probabilistic modeling of likely software, servers and machines that may be unsafe should include the communication patterns indicating the possibility of infection by unintentional access to rogue machines, servers, software or individuals including communication with those software, servers and machines which may have come in contact with others which are suspicious. Such communication patterns (particularly changing ones) may also provide important clues of after the fact infection once a machine has been infected and taken control of e.g., from a hacker or a botnet. The other point to be made in this regard is that code (and by extension is associated machines) are particularly vulnerable to attack if the code itself is not secure. Thus, in determining probability of infection or intrusion, it is useful to apply SDI-SCAM's probabilistic modeling to the assessment of detection, likelihood and characterization of vulnerabilities of each piece of software on the network which, in turn, feeds into the broader general purpose probability analysis of intrusion and infection of software and machines across the network as herein explained.

The persistent distributed agent monitoring is particularly effective in monitoring rogue software at work in the network (or in one of SDI-SCAM's quarantined environments) and hackers being observed (in practice or in one of the system's honey pot traps) is revealing (thus can be data mined autonomously or via human in the loop) to observe and predict potential triggers (e.g. conditions, environments, data, potential targets) which certain types of suspected or identified rogue code or individuals will likely respond to so as to thus elicit their true nefarious natures or to test other triggers to learn more about them. Thus, the adaptive learning model can be learning by not just observing but also by learning triggers that certain types/characterized known "bad actors" tend respond to in a revelatory way thus providing an optimal testing strategy for triggering identifying information about it (is it unsafe or not) and secondly, what are its malicious characteristics or ways in which it can do harm. Particularly when dealing with minimal information a decision tree is a good type of decision-making tool to assess the best tests/sequence thereof for the actor based upon its own limited data profile in view of the overall probabilistic model of the system. This is because a decision tree is very efficient at spanning the space of probabilistically most likely heuristics (via associated tests) most quickly and efficiently in order from highest to lowest relevancy.

In addition to its role in providing certain key knowledge to the overall probabilistic assessment of probability and characterization of infection, intrusion and rogueness of programs, machines and individuals across the network, the application of SDI-SCAM's distributed intelligence providing a "telescopic view" of symptomatic software vulnerabilities is of course also key to ascertaining the identification and characterization of vulnerabilities (particularly the less obvious ones). It may readily tie into thus making more adaptive and comprehensive in a total data volume and data analytic sense existing rule sets for vulnerability detection software and vulnerability anti-exploitation software as well as determining the most effective solutions to recommend to remedy the identified problem, temporarily and more permanently (e.g. patches or redesign in further iterations). SDI-SCAM's distributed sensor network is particularly effective at aggregating and analyzing data across a plethora of installations of a software program, monitoring potentially a variety of heuristics indicative of potential vulnerabilities. Human in the loop or autonomous data analytic insights are thus provided into what vulnerabilities exist and what updates, patches etc. to use in future iterations of the software. Adaptive learning based upon relevance feedback from trial and error may be used to make recommendations thus providing refinements and evolve an adaptive model in order to make recommendations for example for more effective shorter-term solutions such as recommending patches and anti-exploitation solutions which are more specifically targeted to the specific vulnerabilities identified and characterized. In short, SDI-SCAM should do well in detecting, characterizing etc. vulnerabilities particularly so for applying its distributed sensor intelligence to recommending and delivering potentially a host preemptive defensive measures once it has identified and characterized existing and potential vulnerabilities including the possibility of recommending further tests to verify and/or further characterize them.

Tell-tale signs of failure of a software program, a machine or even entire computer network which is insecure could be a big data problem using perhaps non-linear kernel regression methods. Sequential progression/escalation of conditions which presage slowdown or failure are detectable even when such conditions are manifested via combinatorial heuristics. SDI-SCAM's probabilistic comprehensive assessment of vulnerabilities and comprehensive threats can feed into an alternative predictive model developed for predicting failures. In other applications of this concept, a large variety of sensors are used across a plethora of the mechanical systems (particularly engines) of commercial aircraft, fed into a database for "big data" data mining and improved prevention and diagnosis of both impending problems (on an individual basis) and general areas of vulnerability (on a general system engineering level) are all possible. In any event, such a system-level application of SDI-SCAM can make prescient predictions of "trigger" conditions or actions to avoid getting into a "yellow" or caution alert state and those to avoid to prevent getting into a red state (failure or impending failure) once in a yellow state. Or conversely, remediatory actions given any set of current conditions (which are evolving and adaptively learned by trial and error). Of course, the determination of the very fact that conditions characterizing yellow state potentially presaging red state are also part of the big data analysis. Determination/detection and best response (remedial actions) for each associated (probabilistic) alert state and associated set of conditions all seem feasible. Time sequence analytical approaches (e.g. non-linear kernel regression methods) are particularly useful in modeling, identifying responding to (or remediating) temporally evolving system states.

Previous discussions have focused principally upon determining/characterizing general system vulnerabilities (of overall value in software system (re) design and upgrading) but could be useful with regards to individual time-sensitive detection, response/remediation, problem or failure likelihood assessment as well as overall preventative operations strategies for a given software system. The same strategy of big data collection involving a variety (perhaps many) sensors across a large number of objects may be used in determining early warning detection/characterization profiles elucidating presence of conditions associated with (or presaging) potential failures for other types of complex systems like the grid (e.g. blackouts) where SDI-SCAM network of agents monitor for intrusions and infections as well as a host of other variables which are well known in the field of the particular art.

Those skilled in the art will also appreciate that the invention may be applied to other applications and may be modified without departing from the scope of the invention. Accordingly, the scope of the invention is not intended to be limited to the exemplary embodiments described above, but only by the appended claims.

What is claimed is:

1. A system that detects the state of a computer network, comprising:
   a plurality of distributed agents disposed in said computer network, each said distributed agent comprising:
   at least one sensor that analyzes network traffic data to passively collect, monitor, and aggregate data representative of activities of respective nodes within said computer network;
   a distributed adaptive machine learning model that analyzes the aggregated data from the at least one sensor to develop activity models based on collected data and representative activities of the network in a normal state and activities of the computer network in an abnormal state as a result of at least one of intrusions, infections, scams, or suspicious activities in the computer network, wherein analysis of the aggregated data includes performing a pattern analysis on the aggregated data to identify patterns in the aggregated data representative of suspicious activities and providing adaptive rules and a probabilistic model for predicting existing threats, emerging threats, or anticipated threats to said computer network that are updated with relevance feedback, the distributed adaptive learning model further generating counteroffensive measures in response to a predicted existing threat, emerging threat, or anticipated threat to said computer network based on the relevance feedback, wherein the relevance feedback includes trial and error from previously delivered responses to previous threats and attacks on the computer network; and
   means for communicating at least the aggregated data to other distributed agents on a peer-to-peer basis.

2. A system as in claim 1, wherein the at least one sensor scans code on at least one node in the computer network for patterns that have previously been associated with viruses or malicious programming and checks incoming files to the at least one node against known viruses.

3. A system as in claim 1, wherein the at least one sensor monitors code on the at least one node in the computer network for behavior or data traffic patterns consistent with viral infection.

4. A system as in claim 1, wherein the at least one sensor monitors patterns of usage of at least one node in the computer network to identify patterns of usage consistent with a threat to the computer network.

5. A system as in claim 1, wherein the at least one sensor uses natural language processing methods to analyze text for irregularities consistent with a non-human origin or to compare messages in the computer network to previously logged deceptions.

6. A system as in claim 1, wherein the distributed adaptive learning model generates a bogus target for invoking attack on the bogus target and collects data related to the invoked attack for detecting a system infection.

7. A system as in claim 1, further comprising a security network that is isolated from said computer network, wherein the distributed agents communicate with each other over the security network.

8. A system as in claim 1, wherein each distributed agent shares responsibility for network traffic data analysis with at least one other distributed agent.

9. A system that detects the state of a computer network, comprising:

a plurality of distributed agents disposed in said computer network, each said distributed agent comprises at least one sensor that analyzes network traffic data to passively collect, monitor, and aggregate data representative of activities of respective nodes within said computer network and means for communicating at least the aggregated data to other distributed agents on a peer-to-peer basis; and an adaptive machine learning model that analyzes the aggregated data from the at least one sensor to develop activity models based on collected data and representative activities of the network in a normal state and activities of the computer network in an abnormal state as a result of at least one of intrusions, infections, scams, or suspicious activities in the computer network, wherein analysis of the aggregated data includes performing a pattern analysis on the aggregated data to identify patterns in the aggregated data representative of suspicious activities and providing adaptive rules and a probabilistic model for predicting existing threats, emerging threats, or anticipated threats to said computer network that are updated with relevance feedback, the distributed adaptive learning model further generating counteroffensive measures in response to a predicted existing threat, emerging threat, or anticipated threat to said computer network based on the relevance feedback, wherein the relevance feedback includes trial and error from previously delivered responses to previous threats and attacks on the computer network.

10. A system as in claim 9, wherein the at least one sensor scans code on at least one node in the computer network for patterns that have previously been associated with viruses or malicious programming and checks incoming files to the at least one node against known viruses.

11. A system as in claim 9, wherein the at least one sensor monitors code on the at least one node in the computer network for behavior or data traffic patterns consistent with viral infection.

12. A system as in claim 9, wherein the at least one sensor monitors patterns of usage of at least one node in the computer network to identify patterns of usage consistent with a threat to the computer network.

13. A system as in claim 9, wherein the at least one sensor uses natural language processing methods to analyze text for irregularities consistent with a non-human origin or to compare messages in the computer network to previously logged deceptions.

14. A system as in claim 9, wherein the distributed adaptive learning model generates a bogus target for invoking attack on the bogus target and collects data related to the invoked attack for detecting a system infection.

15. A system as in claim 9, further comprising a security network that is isolated from said computer network, wherein the distributed agents communicate with each other over the security network.

16. A system as in claim 9, wherein each distributed agent shares responsibility for network traffic data analysis with at least one other distributed agent.

* * * * *

UNITED STATES PATENT AND TRADEMARK OFFICE
CERTIFICATE OF CORRECTION

| | |
|---|---|
| PATENT NO. | : 11,171,974 B2 |
| APPLICATION NO. | : 15/357399 |
| DATED | : November 9, 2021 |
| INVENTOR(S) | : Yael Gertner, Frederick S. M. Herz and Walter Paul Labys |

It is certified that error appears in the above-identified patent and that said Letters Patent is hereby corrected as shown below:

On the Title Page

Item (71) Fred Herz Patents, LLC City and State: delete "Milton, WV" and insert --Warrington, PA--

Item (72) Frederick S. M. Herz City and State: delete "Milton, WV" and insert --Warrington, PA--

Signed and Sealed this
Second Day of August, 2022

Katherine Kelly Vidal
*Director of the United States Patent and Trademark Office*